Dec. 29, 1936.  G. MUFFLY  2,066,156
SIGNALING MEANS
Filed April 25, 1929    4 Sheets-Sheet 1
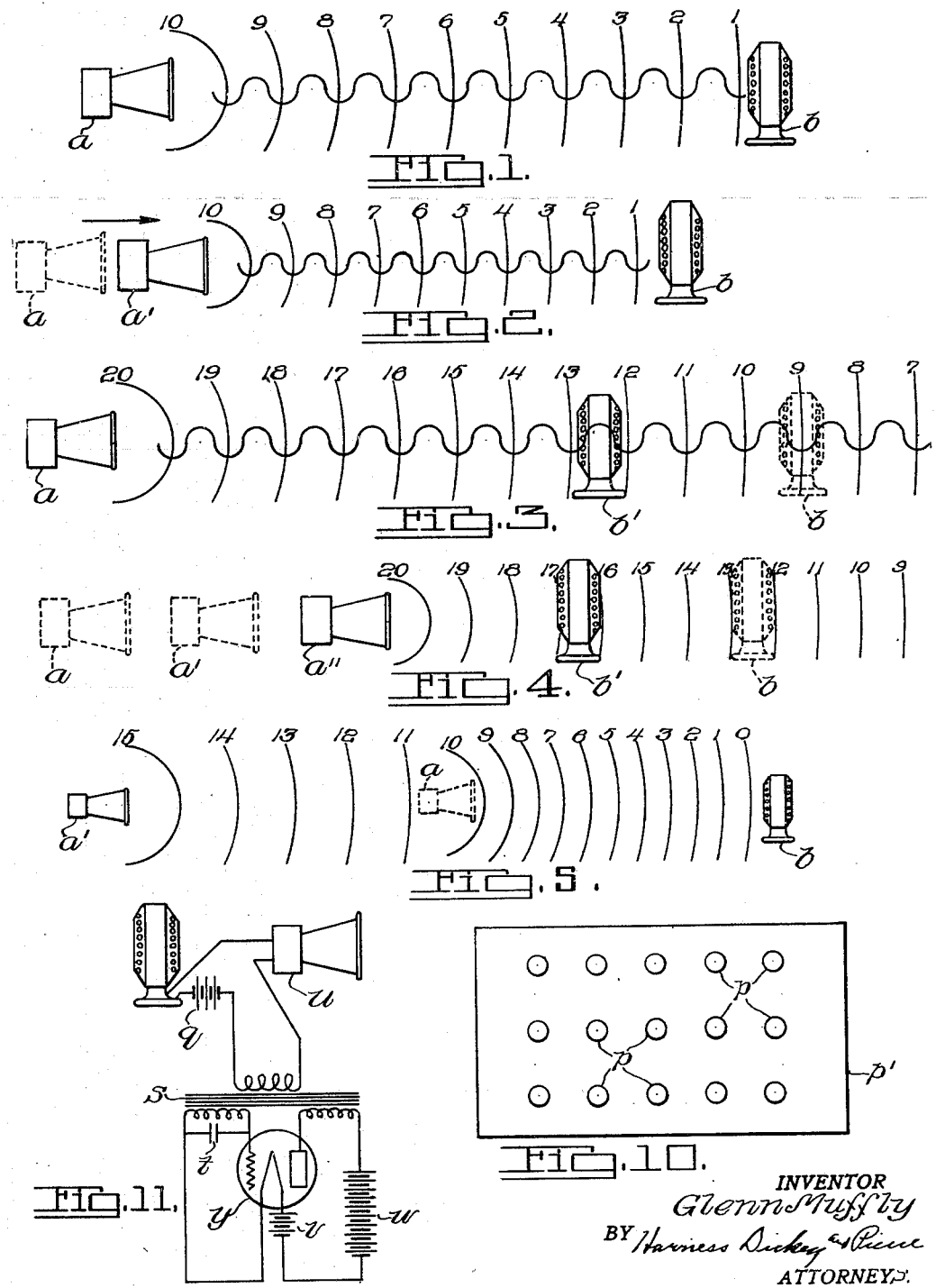

Dec. 29, 1936.     G. MUFFLY     2,066,156
SIGNALING MEANS
Filed April 25, 1929    4 Sheets-Sheet 2
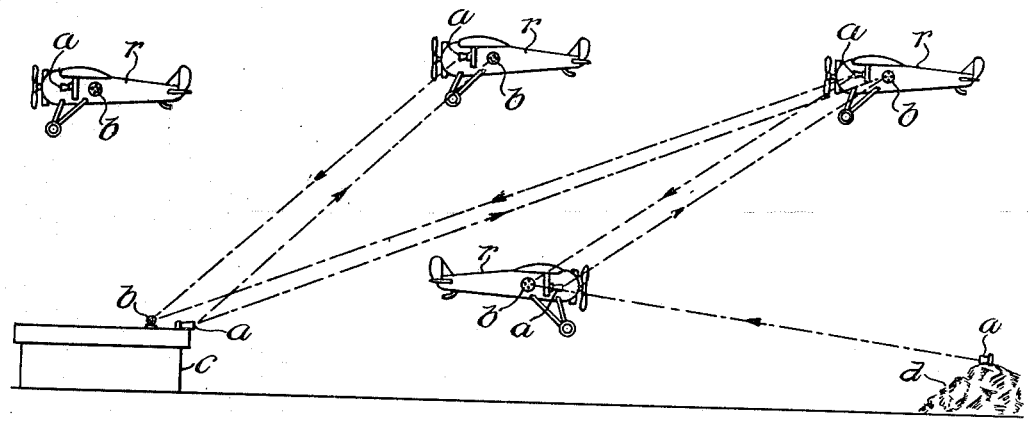
FIG. 6.
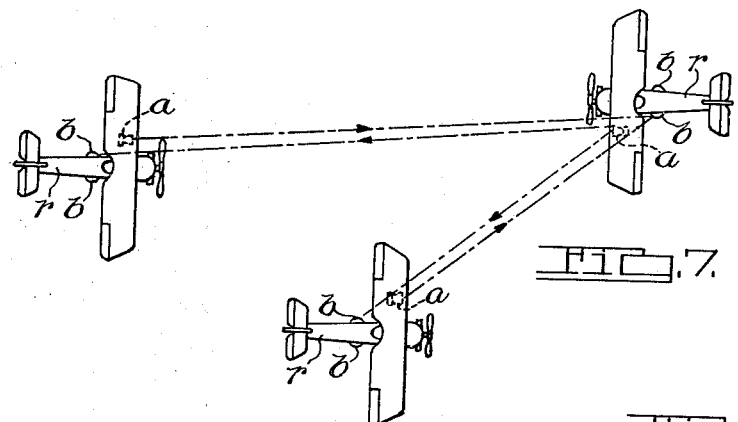
FIG. 7.
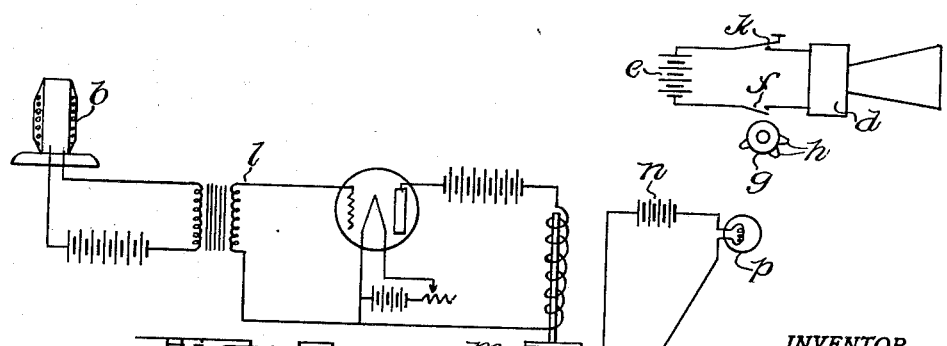
FIG. 8.
FIG. 9.
INVENTOR
Glenn Muffly
BY Harness, Dickey & Pierce
ATTORNEYS.

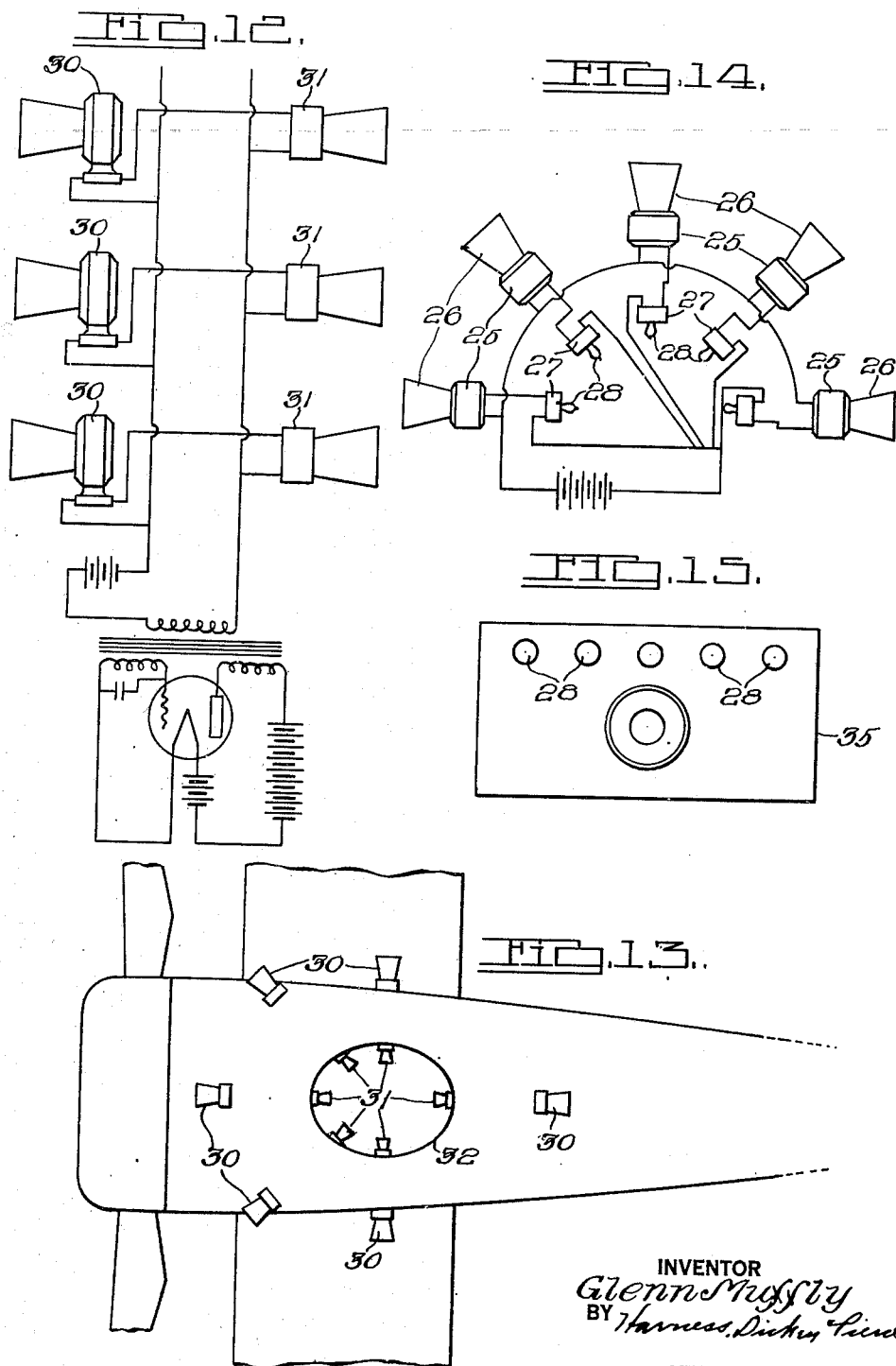

Dec. 29, 1936.   G. MUFFLY   2,066,156
SIGNALING MEANS
Filed April 25, 1929   4 Sheets-Sheet 4
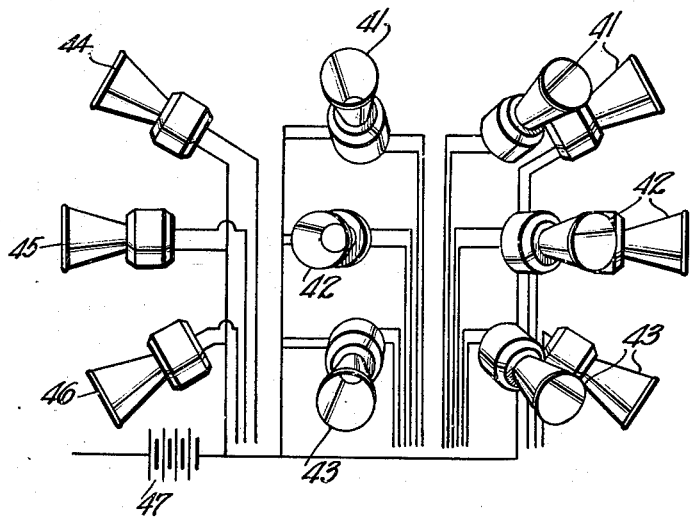
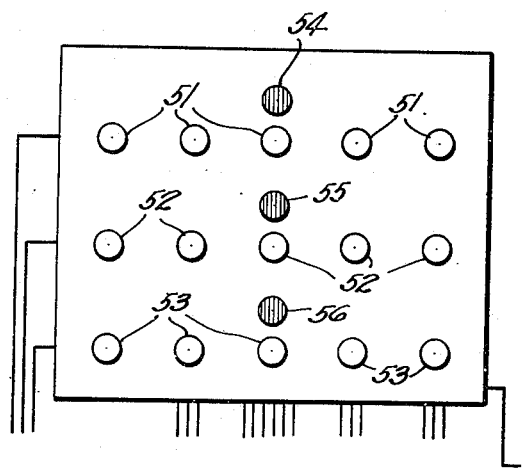
INVENTOR:
Glenn Muffly
BY Harness Dickey and Pierce
ATTORNEYS.

Patented Dec. 29, 1936

2,066,156

UNITED STATES PATENT OFFICE 2,066,156

SIGNALING MEANS

Glenn Muffly, Detroit, Mich.

Application April 25, 1929, Serial No. 357,972

16 Claims. (Cl. 177—352)

This invention relates to signaling means, and the principal object is to provide a signaling means for indicating relative movement between two or more points or objects.

Another object is to provide a signaling means for indicating the relative movement between two or more points or objects, including a vibration sending means at one of said points, and a vibration receiving means at the other of said points normally unresponsive to the frequency of vibrations of the sending means, but responsive to vibrations of a frequency different therefrom.

Another object is to provide intersignaling means for use between relatively moving vehicles, airplanes, boats, or the like, hereinafter referred to as "ships", and between such ships and a fixed point such as a station, whereby the relative approach of one towards the other will be automatically disclosed.

Another object is to provide a system of intership signaling to disclose the relative approach of another ship, or the relative approach of a ship to a ground or other station, including a vibration sending device of predetermined standardized frequency carried by each of said ships or said ground stations, together with a vibration receiving device carried by each of said ships or stations normally unresponsive to said standardized frequency but responsive to frequencies greater than said standard frequencies, or to harmonics thereof, whereby to effect a sensible signal apparent to a person in said ships or stations.

Another object is to provide relativity signaling means operable to sensibly indicate the relative direction of movement between two points.

Another object is to provide relativity signaling means including a receiving means adapted to both audibly and visually indicate relative movement between two points.

Another object is to provide relativity signaling means including a receiving means adapted to both audibly and visually indicate relative movement between two points, and in which the audible and visual signals are operable independently of each other, whereby the inoperativeness of one due to damage or other causes, will not interfere with the operativeness of the other.

Another object is to provide a signaling means for relatively movable stations to indicate relative movement between said stations, including impulse sending means for sending impulses at a frequency above the audible range and at such a frequency that a relative movement between the stations will cause an audible beat note.

A further object is to provide such means of signaling through the medium of wave lengths that will not interfere with the normal operation of ships, with the comfort of pilots or passengers, or with the radio reception at either fixed or moving points.

A still further object is to make the signals effective under all conditions of fog, darkness, smoke, clouds, light, sound, etc., and to insure that signals will be unaffected by any wave frequencies that are normally employed on aircraft or other ships, such as the frequency of radio or ignition apparatus, mechanical vibrations of engines, gears, propellers, or like mechanical parts.

The above being among the objects of the present invention, the same consists in certain features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views:

Figs. 1 to 5 inclusive are more or less diagrammatic sketches for illustrating the principle of the present invention, and indicating the transmission of sound waves between a sending and a receiving point.

Figs. 6 and 7 are more or less diagrammatic views illustrating airplanes and stationary points between which a relative movement is taking place, and which are illustrated for the purpose of further explaining the present invention.

Fig. 8 is a more or less diagrammatic view illustrating a modification of the vibration sending means that may be employed in connection with the present invention.

Fig. 9 is a more or less diagrammatic view of a receiving device which may be employed in connection with the present invention, and in which the sensible signal comprises a light.

Fig. 10 is a more or less diagrammatic view of a panel that may be employed in connection with a station, stationary or movable, and in connection with which a plurality of receiving signal means are provided in order to indicate the direction of relative approach of one station relative to the other.

Fig. 11 is a more or less diagrammatic view of a modified form of receiving means in which the sensible signal comprises an audible signal.

Fig. 12 is a more or less diagrammatic view of a hook-up that may be employed for directional indication by audible signals.

Fig. 13 is a more or less diagrammatic partially broken plan view of an airplane indicating the manner in which the apparatus shown in Fig. 12 may be arranged for directional indication of relatively movable stations.

Fig. 14 is a more or less diagrammatic view showing the manner in which the visible signaling mechanism of Fig. 9 may be arranged in multiples to indicate the direction of relative approach of another station.

Fig. 15 is a face view of an instrument panel in which the visible indicating means of Fig. 14 are suitably arranged in combination with an audible signal constructed as shown in Fig. 11.

Fig. 16 is a side elevation of a receiving station similar to that shown in Fig. 14, but including rearwardly directed apparatus and showing the upwardly and downwardly inclined sets of receiving apparatus.

Fig. 17 is a signal board or panel on which lamps are shown which lamps are controlled by the apparatus seen in Fig. 16.

The primary object of this invention is to provide means for inter-aircraft signaling for the purpose of preventing collisions, and means for interchange of signals between an aircraft and a fixed point such as a landing field to show when the aircraft is approaching the fixed point. This will be useful in assisting the pilot of the aircraft to locate the landing field under adverse weather conditions and to notify the attendants at the field of the aircraft's approach so that lights may be turned on and other measures taken to provide for the safe arrival of the approaching aircraft.

The details of any selected embodiment of the invention will vary according to the class of wave selected as the "standard" hereinafter mentioned, and I wish to have it understood that my invention is not limited to the particular types of waves mentioned in this application, nor to the particular types of sending and receiving devices used herein to illustrate the broad principle covered by my claims. By the substitution of other well known details for those herein used to illustrate my idea, it will be obvious to those skilled in the various arts that might be employed that I could use electrical, magnetic, thermal, radio, light, invisible light, or other radio-active means for producing waves without departing from the spirit of my invention as herein dsclosed. For the purpose of describing my invention I have chosen to use the example of sound waves, preferably in the ranges of frequencies above or below those that are audible to the human ear.

The means shown employed herein is for the purpose of describing my invention, and has been selected because it is one of the more simple in application and probably the most easily described and understood. My selection of sound waves outside of the audible range is further influenced by the facts that they travel at about the ideal velocity for my purpose and the required apparatus is for the most part available on the market at present.

I use aircraft for the purpose of illustration because I wish to emphasize the three dimensional application of my invention and because I consider my invention to be most needed in this field, but it is understood that my invention applies equally to other types of vehicles travelling through space in one, two or three dimensions. Whatever I say regarding aircraft would apply to submarine signaling, making the required corrections for velocity of the signal in water instead of air, and likewise it is evident that signals might be transmitted through other media than air in the case of land or subway transportation. Other kinds and frequencies of waves travelling through space independent of the atmosphere and recognized forms of matter are in mind in writing this specification and the attached claims, which are intended to broadly cover relativity signaling rather than the specific details of the various types of equipment that may be used.

My invention will be best understood and most easily applied in practice by means of the following description which is based upon the relativity of sound wave transmission.

The fundamental principle of relativity involved can be demonstrated audibly by any observer who has good hearing and is able to distinguish slight changes in the pitch of a sound. A man standing beside a railroad hears the whistle of an approaching train and notes its pitch; after the locomotive has passed him it whistles again and he notes that the pitch of the sound is lower on the musical scale. The same thing can be observed in the case of the siren on a piece of fire fighting equipment passing the observer. The driver of an automobile travelling at high speed passes a factory while its whistle is blowing and observes that the key of the whistle is higher while he is approaching than after he has passed. A passenger in an airplane listens to the roar of another plane approaching and after the planes have passed in opposite directions he is able to detect a decided change as if the motor of the other plane had suddenly been cut down in speed at the instant of passing the plane in which he is riding. An observer on the ground gets the same impression when a plane flies close over his head. The pitch of the sound is higher while the plane is approaching than after it has passed, giving the observer the impression that the pilot suddenly cut down his throttle at the instant that the plane passed above the observer's head.

With these few preliminary explanations I now describe the scientific reason back of these audible demonstrations, continuing to use sound waves as my illustration.

Referring to the drawings, we see in Fig. 1 the horn $a$, which may be an ordinary electric horn such as is used on automobiles except that I have assumed it, in this case, to be producing a very low pitch note of ten vibrations per second, which is below the audible range. The microphone $b$ is assumed to be located approximately 1,089 feet distant from the horn $a$, this being the distance that sound travels in one second. Assume now that the horn $a$ has been blowing for exactly one second and we note that the beginning of the first wave has just reached the microphone $b$, but has not as yet affected it. Should the horn $a$ cease to produce sound at this instant and the microphone $b$ remain stationary the ten sound waves numbered from 1 to 10 inclusive would impinge upon the microphone during the following second and their frequency would be the same at the point of reception as it was at the point of sending.

Fig. 2 illustrates a different condition, comparable to the case of the observer standing on the ground while an airplane approaches at a low altitude. The horn has been sounding for exactly one second, having been located at $a$ at the start of the period of one second and having moved at uniform velocity to the position $a'$ during the one second period of sound production. The first sound wave has travelled exactly the same distance in the one second of time as in the case in Fig. 1, but each following wave has been shortened relative to the microphone b due to the fact that the horn a has been moving in the direction indicated by the arrow, and now we see that sound wave No. 10 is produced at a point nearer to the microphone b than was sound wave No. 1. The intervening sound waves occurring at successively shorter distances from b as the horn approaches the microphone. Assuming that the horn stops blowing at this instant we see that it will take less than one second for wave No. 10 to reach the microphone, hence all ten waves will strike the microphone within a period of something less than one second and necessarily at shorter time intervals between waves, or in other words, at a higher frequency.

Fig. 3 illustrates a case comparable to that of the motorist who approaches the factory whistle and observes the sound as of higher than normal pitch. This figure illustrates the same condition as Fig. 1, except that the microphone b is assumed to have moved to the position b' during the second second of sound production by the horn a, which in this case is assumed to have continued to sound for two seconds or longer. The condition at the end of the first second, during which b did not move, is as shown in Fig. 1 and the condition at the end of the second second is as shown in Fig. 3, hence it will be seen that during this second second the microphone, moving from b to b', has encountered thirteen waves instead of the normal ten waves that would have been received in one second if it had remained stationary.

Thus far we have considered that only the sending or the receiving station has been moved and, according to the scale of the three figures, the rate of relative approach has increased the frequency only about 30%, from ten per second up to thirteen per second, which is still below the audible sound range. Receiving apparatus of suitable type would, of course, indicate this increase of frequency, but the sound has not yet been brought within range of the human ear, which ordinarily picks up nothing under fifteen vibrations per second.

Fig. 4 illustrates the condition of mutual movement toward each other by the horn and the microphone. This is the condition experienced by the passenger in one airplane listening to the motor of another plane about to be met, going in the opposite direction. Referring back to Fig. 2, we see the condition of the horn approaching the microphone at the end of one second, which view corresponds to a' and b of Fig. 4. Starting with the relative positions shown by Fig. 2 and assuming the microphone to move to position b' while the horn continues to move from a' to a'' at uniform speeds during the second second of sound production by the horn we see that during this second second the microphone has encountered 17 sound waves, or is receiving vibrations at the rate of seventeen per second, a rate within the audible range of a good human ear.

Fig. 5 illustrates the condition of relative recession instead of approach. This view is drawn on one-half the scale of the preceding views. Considering only the right hand portion of this figure, including the horn a and the microphone b, we have a duplicate of Fig. 1 on a reduced scale. Now we assume that during the next half second the horn a, continuing to sound at the standard frequency of ten vibrations per second moves away from b to the position a'. Since a' is twice as far from b as a is from b it is obvious that two seconds will be required for sound to travel from a' to b. This means that during the second second of reception at b only five sound waves will be received. This makes the frequency still farther from the audible range and probably not even the microphone will be affected by this frequency.

The application of this principle is shown in Figs. 6 and 7, wherein the same reference characters indicate sending and receiving devices, mounted on moving vehicles r or at fixed points such as on the hangar c or the mountain top d. Each of the airplanes is equipped with a horn or sending device a of standardized frequency, preferably below the audible range, and also with a microphone or other receiving device b capable of responding to waves received at a somewhat higher frequency and from that on up to the maximum frequency that it is anticipated that might be produced by the most rapid approach of two planes.

Directional control of sound reception by means of tubular or funnel-shaped receiving horns as indicated in Figs. 12 and 13 is a simple matter and radio art has taught us directional reception, hence to equip an airplane or other vehicle with a plurality of receiving devices each pointed in some certain direction is a simple step and we have only to provide means for distinguishing at the point of reception between the various angles from which the signal might come, to provide the pilot with a definite signal showing not only that he is relatively approaching another sending device, but from approximately what direction the signal is coming. For this purpose I have indicated in Figs. 6 and 7, and in more detail in Figs. 12 to 14 inclusive, that receiving devices may be located at various points on the vehicle to receive from various angles. This multiplication of apparatus may be carried to any desirable degree, it being necessary to multiply the reception means only.

Sending means will usually be more simple than reception means, though one application of my invention is to use only a sending device using a standardized or predetermined frequency of sound waves below the audible range and to depend upon the ears of pilots to pick up any signals that are brought up into the range of audibility by a rapid relative approach.

A further refinement of the sending means is shown in Fig. 8 in which the horn a is actuated by the battery e to send a code by means of the intermittent closing and opening of the switch f through the medium of the rotating wheel g on which are located the teeth h so spaced as to produce a code signal to identify the source. Such a code can be arranged to identify fixed stations to facilitate the following of a particular route or to identify various classes of vehicles which have various rights of way by law or by mutual agreement. The switch k is provided so that the sending device may be shut off manually, or if desired this switch may be automatically actuated upon landing or taking off so that an airplane or other vehicle will send its signal only while in motion.

Fig. 9 illustrates one means for transforming the signal at the point of reception to one that is apparent to some other human sense than that of hearing. For the purpose of illustration I have selected the sense of sight, and show means for lighting a lamp. The receiving microphone b through the medium of the well-known radio and electrical apparatus indicated generally as *l* operates the relay switch *m* to close the circuit through the battery *n* and the lamp *p* to produce a visible signal.

This apparatus may be arranged in multiple by duplicating the necessary parts to light one or more of a plurality of lamps *p* on a signal board *p'* as shown in Fig. 10. These lamps may be of various colors to indicate varying degrees of danger and operated by the reception of various corresponding frequencies, or they may be arranged to indicate the angle of approach, or both. One exact manner in which this may be done is shown in Fig. 14 in which the microphones 25 are open to sound reception in substantially one direction only as controlled by the horn portions 26. The microphones 25 may be suitably arranged on a station, either stationary or movable, so that each is adapted to receive signals coming from a different direction. Each microphone is connected to an individual signal transforming device indicated generally as 27, which may be constructed in accordance with the showing in Fig. 9, and each of which is provided with an individual visual signal in the form of a lamp bulb 28, corresponding to the bulb *p* in Fig. 9, adapted to be lighted upon reception of a signal received by its corresponding microphone. In fact, by considering Fig. 14 as representing three superposed sets of signal receiving devices each of the construction of the one visible, with the upper set inclined upwardly to receive signals from a higher plane, the central set disposed to receive signals from the same plane, and the lower set downwardly inclined to receive signals from lower plane, and by considering the bulbs 28 as being the upper row of bulbs *p* in Fig. 10, the bulbs for the central set as the center row of bulbs *p* in Fig. 10, and the bulbs for the lower set as the lower row of bulbs *p* in Fig. 10, an apparatus is provided for indicating in three dimensions the direction of approach of a cooperating sending station.

The arrangement above described is shown in Fig. 16 and Fig. 17. Fig. 16 is a side elevation in which the receiving assemblies 42 correspond to 26 and 25 of Fig. 14. Assemblies 41 and 43 are similar except for their angles of inclination and the additional rearwardly directed receiving assemblies are added to pick up signals from planes approaching from the rear, overtaking the one carrying the apparatus seen in Fig. 16. When apparatus as shown in Fig. 16 and Fig. 17 is employed at a landing field or other ground station the number of directional receiving apparatus units and the number of directions may be increased, but the downwardly directed units are naturally omitted.

The signal panel seen in Fig. 17 is similar to the one shown in Fig. 15, but is provided with more lamps 51 to 56 inclusive to correspond with the larger number of receiving units in Fig. 16. The lamps 54, 55 and 56 are shown lined for red and are connected with the rearwardly directed receiving units 44, 45 and 46. These lamps give warning of an overtaking plane approaching from the rear. Each of the receiving units 41 to 46 inclusive comprises means for receiving waves of greater frequency than standard to the exclusion of waves at standard or lower-than-standard frequencies.

The battery 47 of Fig. 16 is connected with a conductor leading to one side of each of the signal lamps in Fig. 17 as well as to another conductor leading to one pole of each of the receiving units in Fig. 16, thus furnishing current to any lamp or lamps of Fig. 17 as required.

Thus far the detail applications of my invention have been shown as if only low frequency sound waves were to be used, but for some reasons it may appear preferable to employ other frequencies and as an illustration of how this may be done I show in Fig. 11 one method of reception suitable for sound waves higher than the audible range and the conversion of such reception into a signal perceptible to one or more of the human senses.

In Fig. 11 the microphone *b* or other suitable receiving device is designed to respond to no frequencies other than frequencies above the standardized one which all stations and vehicles are sending, hence responds to waves received from a relatively approaching sending device and itself sends current from the battery *q* to the oscillator coil with pick-up designated by the assembly *s*. The received frequency passes through the horn *u* without producing sound as it is now assumed that we are using a frequency above the audible range. The received supersonic frequency, being higher than the standardized sending frequency produces a beat note in the radio oscillator coil and pick-up assembly *s* which is properly tuned to produce this effect and through the medium of the batteries *v* and *w* and the vacuum tube *y* produces an audible frequency of beat note in the horn *u* whenever the relative speed of approach exceeds the pre-selected speed at which the warning signal is desired. One or more condensers *t* are provided in this hook-up which will be recognized as superheterodyne radio apparatus.

With this arrangement we might select a standardized sending frequency of 25,000 per second, which would be increased approximately 2% by a relative rate of approach of fifteen miles per hour. This would give an audible beat note at a frequency of approximately 500 per second. The pitch of the beat note would be rapidly increased by the increasing differential produced by a more rapid approach. At a relative speed of approach equal to half the velocity of sound we would get a beat note of 12,500 per second, which is still well within the audible range. This condition would occur when two planes going in opposite directions approach each other at a relative speed of approximately 375 miles per hour. The pilot is thus given an audible warning of a rapid approach as distinguished from a slow approach by means of the higher pitch of the beat note that is turned into sound by the horn *u*.

This type of apparatus may be employed for directional indication in a manner similar to the application of the visible signal of Fig. 9 to the arrangements shown in Figs. 10 and 14. One method of accomplishing this is shown in Figs. 12 and 13, a preferred hook-up being shown in Fig. 12 and its practical application to an airplane in Fig. 13. As illustrated in Fig. 12, a plurality of directional reception microphones 30 each connected in series with an audible signal means 31, are connected in parallel with superheterodyne means of the same construction as shown in Fig. 11. A number of microphones 30 thus connected may be arranged around the cockpit 32 of an airplane as indicated in Fig. 13, and the corresponding audible signals 31 be arranged in the cockpit 32 in a direction corresponding to the direction of reception of the corresponding microphones 30 so that the pilot may determine, by the particular signal affected by the relative approach of a cooperating station, the direction of approach of such station.

The high pitch of a beat note which warns the pilot of a dangerously fast relative approach may, of course, be combined with the visible signal to advise the pilot as to the angle from which the dangerous approach is occurring. This may be accomplished as indicated in Fig. 15 which indicates a panel 35 upon which the bulbs 28 of the apparatus shown in Fig. 14 are mounted, and upon which the horn $u$ of the apparatus shown in Fig. 11 is shown mounted, the bulbs 28 and horn $u$ being operated by entirely independent apparatus so that failure of one will not affect the proper functioning of the other.

It will be apparent that the frequency of the sending apparatus may be much greater than that which may be directly detected by the human ear, and that perfect or nearly perfect synchronism between two sending means will produce no beat note, or will produce one that is below the audible range when the stations are not moving relative to one another, but which beat note becomes apparent upon relative approach of the two stations. This same principle is, of course, also applicable to other than audible signals.

It will also be apparent that my invention is applicable to the relative spacing of signals as well as to their relative wave lengths. For instance an intermittent sound of any frequency might be sent in dots or dashes at the rate of four per second and be changed to five per second in case the relative approach is one-fourth the velocity of sound, or approximately 187 miles per hour.

The sending means may also be constructed to send out waves at a frequency considerably over the audible range and at such a frequency that the waves sent out by two relatively moving stations, whether approaching each other or receding from each other, will combine to produce a beat note well within the audible range of the human ear. The relative approach or recession in this case will be indicated by the increase or decrease of the volume of the beat note, and the pitch of the beat note will indicate the velocity of relative approach or recedence. No receiving means other than the human ear is necessary in such a case, although it will be apparent that this same idea may be employed where the beat note may be outside of the audible range of the human ear and in such case a receiving apparatus designed to be affected by the beat note may be provided for producing a signal apparent to one of the five senses of the human being.

With these fundamentals in mind it is very easy for one skilled in the art of telephony to provide means, such as a microphone for instance, for picking up sound waves in the higher frequencies without any disturbance from those of frequencies below the standard sending frequency, which must of itself be such that nearby receiving apparatus will not be affected unless there is a relative rate of approach higher than some predetermined minimum that it is desired to pick up. In this manner the beat note of relative recedence may be prevented from producing a signal, leaving the reception means clear for the indication of approaches only, the same general type of apparatus shown in Fig. 11 may be employed for this purpose.

Similar arrangements are possible with other classes of wave signals, such as radio and light waves. These much higher velocity forms of radio activity may prove valuable when higher velocities of travel are available. I mention them here among many forms of wave signals that are included under the scope of my invention.

Having now described my invention, it is to be understood, for the purpose of laying a proper basis for the following claims, that the horn or sending device $a$ is to be considered as capable of sending, as the case may warrant, audible impulses, impulses of a frequency below the audible range, or impulses above the audible range. Likewise it is to be understood in each of said cases that the receiving apparatus, where necessary, is varied to receive and sensibly indicate the reception of such impulses when changed in frequency by a relative movement which causes the straight line distance between a sending and a receiving point to be reduced at a rate faster than a predetermined maximum rate below which the velocity of relative approach is not considered dangerous.

Formal changes may be made in the specific embodiment of the invention described without departing from the spirit or substance of the broad invention, the scope of which is commensurate with the appended claims.

What I claim is:

1. An aircraft signaling system comprising, in combination, a sending means adapted to send out waves of a predetermined constant frequency, and a receiving means for said waves adapted to produce a sensible signal only upon receiving said waves at a frequency higher than said predetermined frequency, at least one of said means being carried by an aircraft.

2. In combination, a pair of relatively movable stations, an impulse sending means carried by each of said stations, said means adapted to send impulses of the same predetermined frequency, receiving means carried by each of said stations and capable of being affected by said sending means at the other of said stations, said receiving means being sensibly non-responsive to impulses of the same frequency as said sending means but being responsive to higher frequency impulses closely approaching the frequency of said sending means, said receiving means including automatic signaling means apparent to one of the five senses of a human being.

3. In combination, a ship designed for aerial navigation, means carried by said ship for sending vibrations of a predetermined standardized frequency, and means also carried by said ship for receiving similar vibrations and sensible to said vibrations only over a range of frequencies higher than said standardized frequency for the purpose of automatically giving a warning of the relative approach of another ship or signaling station equipped with a similar sending means.

4. A signaling system comprising means for sending supersonic sound waves of a standardized frequency and separate means for receiving such waves including means for generating waves such that an audible beat note will be produced when said means are relatively approaching at a velocity higher than a pre-arranged maximum velocity below which no signal is desired, at least one of said means being carried by a movable body.

5. A signaling system including means for sending sound waves outside of the normally audible range, means carried by a movable body for receiving said waves only after their frequency has been increased by relative movement between sending and receiving means, and automatic means for making a signal thus received apparent to one or more of the human senses.

6. Inter-aircraft signaling means comprising means carried by an aircraft for sending impulses of a predetermined constant frequency and directional indicating means for receiving said impulses, the last mentioned means being automatically responsive only to said impulses at frequencies higher than said predetermined frequency to actuate a sensible signal.

7. Receiving apparatus for a relativity signaling system comprising means for visual indication of the direction from which a station sending out impulses of a constant frequency is relatively approaching and audible means arranged to automatically indicate the relative approach of a similar sending station only when such approach occurs at a velocity higher than a given velocity above which said audible means is designed to function.

8. Receiving apparatus for a relativity signaling system comprising automatic means for indication of the direction from which a station sending out impulses of a constant frequency is relatively approaching, and means arranged to indicate the relative approach of a similar sending station only when such approach occurs at a velocity higher than a given velocity above which said means is designed to function.

9. Receiving apparatus for a Doppler effect relativity signaling system comprising means for indication of the direction from which a station sending out impulses of a constant frequency is relatively approaching, and means arranged to automatically indicate the relative approach of a similar sending station only when such approach occurs at a velocity higher than a given velocity above which said means is designed to function, said means being arranged to operate independently of each other whereby one means might be damaged to the extent of failure to operate without affecting the operation of the other means.

10. In a signaling system, in combination, a wave sending apparatus, a wave receiving apparatus, and an automatically operated audible and visual signal operated by said wave receiving apparatus only during movement of said sending apparatus relatively toward said receiving apparatus.

11. In a signaling system, in combination, a wave sending apparatus, a wave receiving apparatus, and an audible and visual signal operated by said wave receiving apparatus only during movement of said sending apparatus relatively toward said receiving apparatus, said audible signal and said visual signal being automatically operative independently of each other.

12. A system for warning of the relative approach of a conveyance to an object, comprising means associated with one of said bodies for emitting oscillations at a frequency inaudible to the human ear, and means upon the other body for receiving the oscillations, the receiving means being incapable of response to the oscillations when the frequency thereof has not been increased by reason of relative approach of the object and the conveyance, but being inherently responsive to a higher range of frequencies resulting from said relative approach to produce a warning signal.

13. A method of warning of the relative approach of a conveyance to an object which comprises emitting vibrations from the object at a frequency so low as to be inaudible to the listener upon the conveyance except when the object and the conveyance approach each other at a rate such as to bring the frequency of the vibrations as received within the range of audibility.

14. A system for warning of the relative approach of an aircraft to a body which comprises means for emitting vibrations into the air as a carrier medium at an inaudible frequency from one of said objects and means responsive to said vibrations only when the frequency exceeds a predetermined value in excess of the real frequency of emission for giving a warning signal when the rate of approach exceeds a predetermined value.

15. In a system for protecting aircraft against collision, a wave transmitter on each aircraft, each of said wave transmitters having a certain range of influence, and each of said wave transmitters having means associated therewith to produce a desired indication in response to interference produced between the wave radiated from one transmitter and the wave radiated by the transmitter on another aircraft within its respective range.

16. The method of indicating the proximity of two aircraft on each of said craft which includes radiating oscillations from each craft and utilizing the mutual interference between the radiated oscillations from the two craft to produce an indication on each craft.

GLENN MUFFLY.